Figure 1:
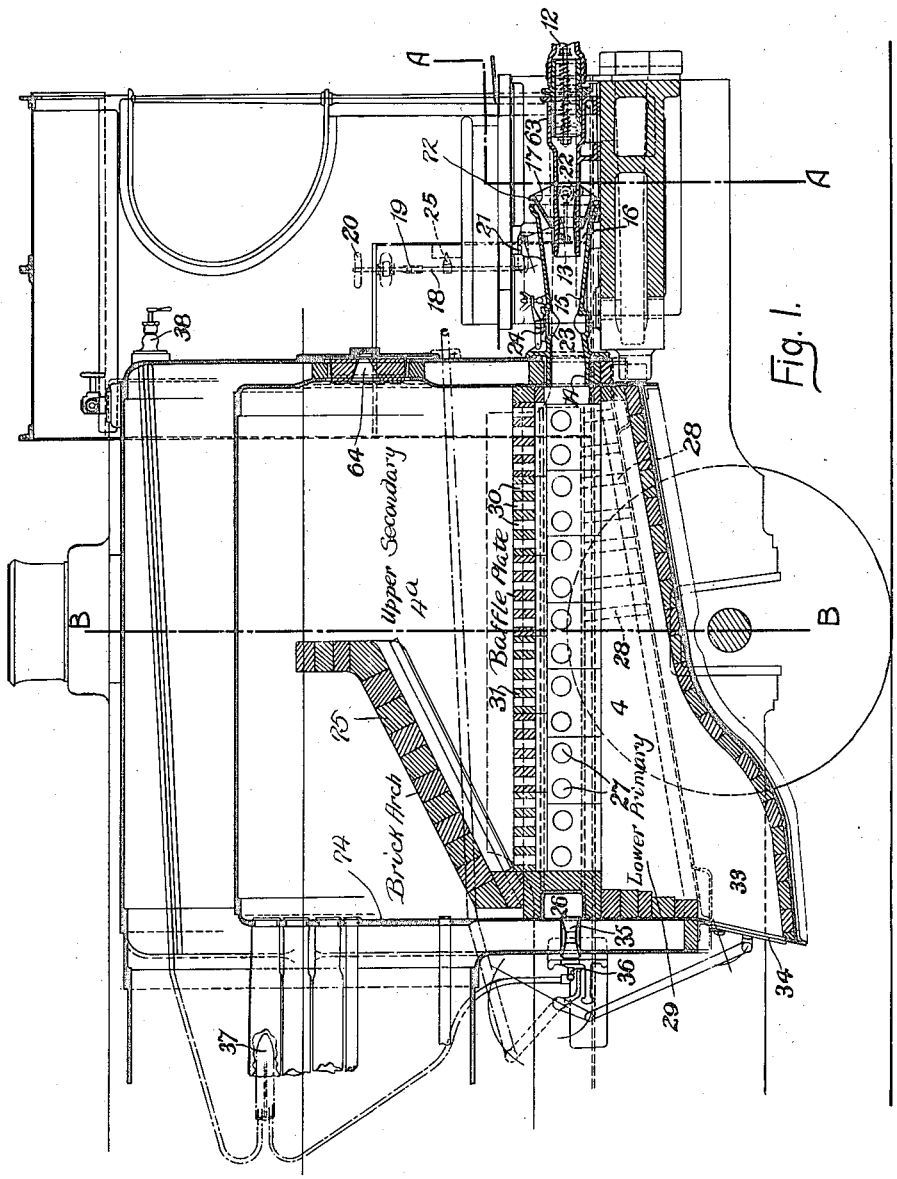

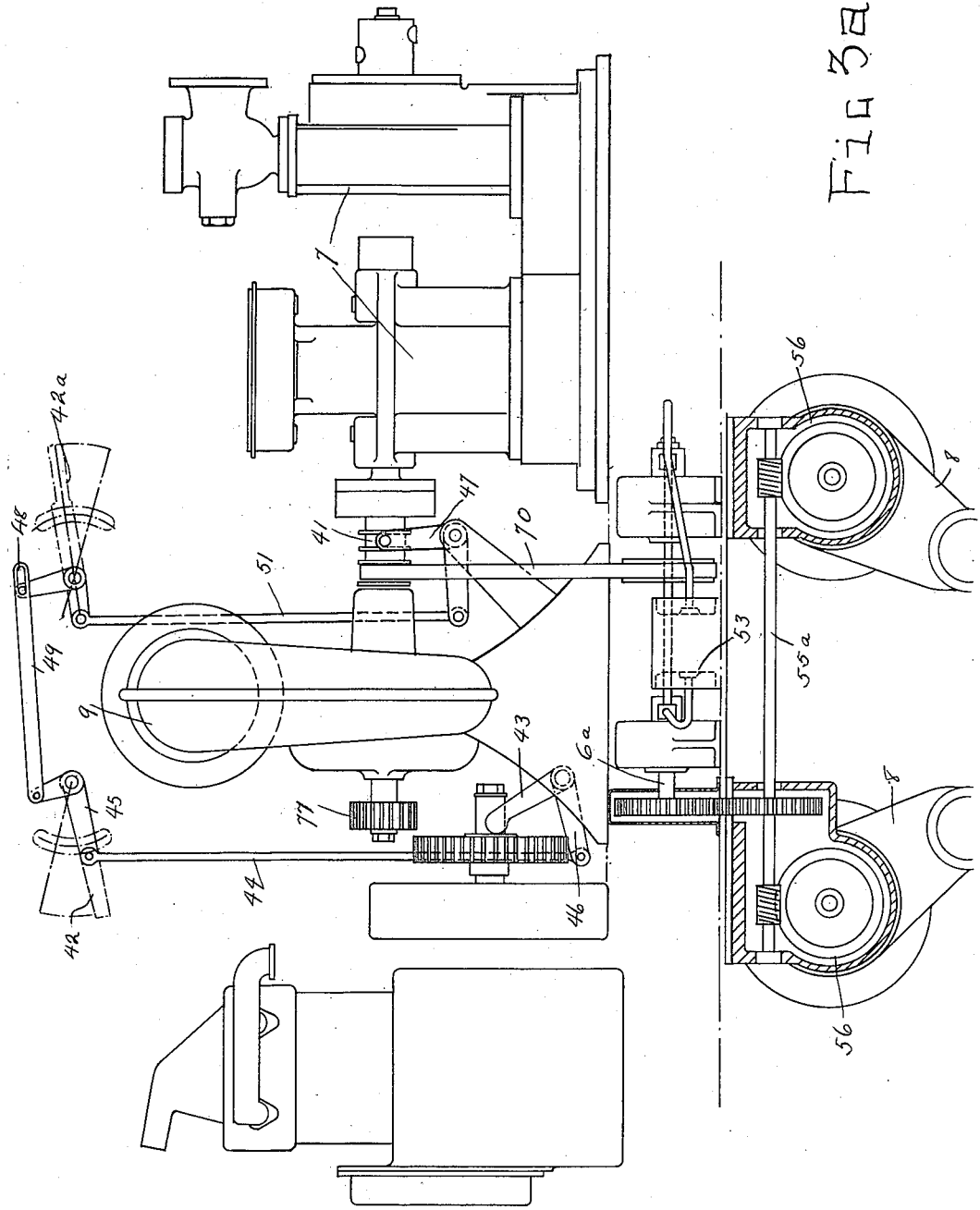

J. G. ROBINSON.
MEANS FOR USING PULVERIZED FUEL IN THE FURNACES OF STEAM GENERATORS.
APPLICATION FILED MAY 26, 1917.

1,416,512.

Patented May 16, 1922.
6 SHEETS—SHEET 5.

Inventor
John George Robinson,
By B. Singer, Atty.

J. G. ROBINSON.
MEANS FOR USING PULVERIZED FUEL IN THE FURNACES OF STEAM GENERATORS.
APPLICATION FILED MAY 26, 1917.
1,416,512.
Patented May 16, 1922.
6 SHEETS—SHEET 6.
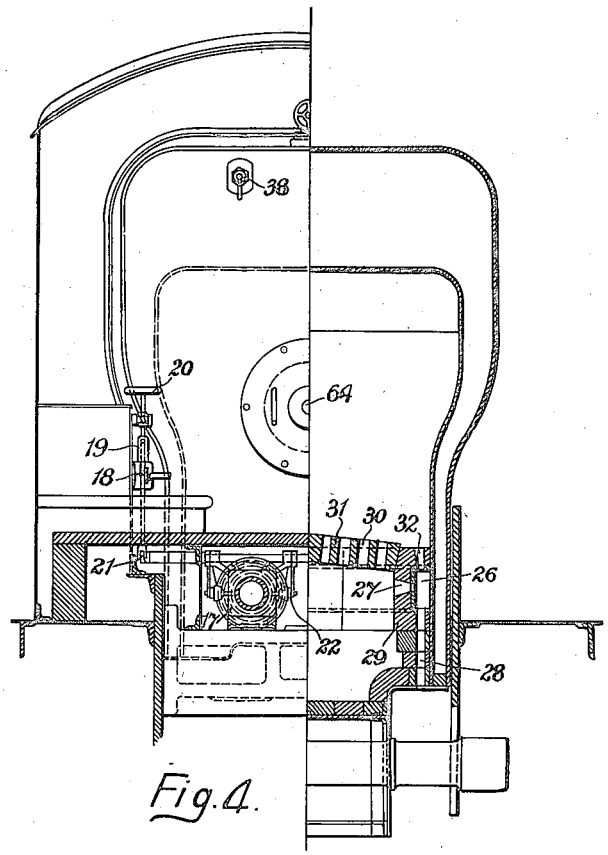
Fig. 4.
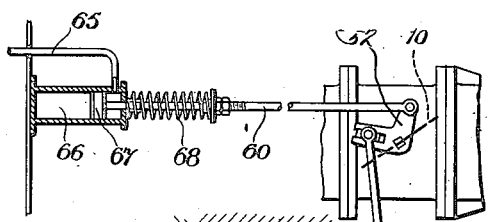
Fig. 5.
Fig. 4ª
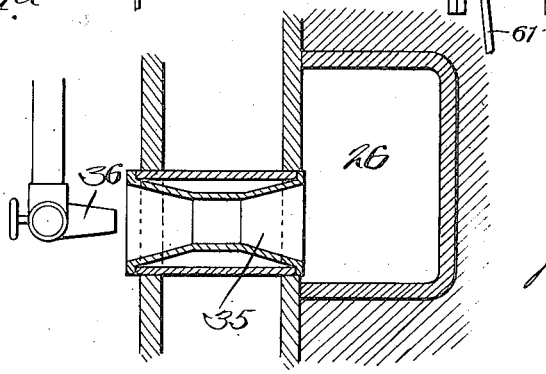
Inventor:-
John George Robinson,
By:- B. Singer,
Atty.

UNITED STATES PATENT OFFICE.

JOHN GEORGE ROBINSON, OF MANCHESTER, ENGLAND.

MEANS FOR USING PULVERIZED FUEL IN THE FURNACES OF STEAM GENERATORS.

1,416,512.	Specification of Letters Patent.	Patented May 16, 1922.

Application filed May 26, 1917. Serial No. 171,160.

*To all whom it may concern:*

Be it known that I, JOHN GEORGE ROBINSON, a subject of the King of Great Britain, and resident of Manchester, England, have invented certain new and useful Improvements in Means for Using Pulverized Fuel in the Furnaces of Steam Generators, of which the following is a specification.

This invention relates to improvements in and connected with the use of pulverized fuel in the furnaces of steam generators and has for its primary object the provision of means whereby pulverized fuel can be effectively employed in the furnaces of locomotives although the principles and arrangements involved may be found useful for the furnaces of other steam generators.

One of the disadvantages hitherto obtaining in connection with the use of pulverized fuel resides in the fact that the fuel is fed to the furnace by mechanical means such as screw conveyors and by draught derived from some form of fan or blower, and it will be apparent at once that this involves difficulties in starting up from cold before steam is available in the boiler to drive the conveyors and fan or blower.

Another difficulty is that in admixture with air the pulverized fuel is explosive and among the features of my invention which are of primary importance may be mentioned the provision of auxiliary means whereby starting up is effected and the provision of a firing tube adjacent the burners which can be entirely closed while the initial heating process is being effected. A further feature of my invention is the provision of means whereby the speed of the fuel conveyors and the valve controlling the air blast are controlled by a common controlling means.

A still further important feature is the provision of an independently adjustable opening for the admission of induced auxiliary air to the furnace whereby the required proportion of air for ensuring complete combustion can be definitely regulated.

My invention further comprises the provision in combination of a receptacle for containing the pulverized fuel, an auxiliary prime mover for feeding the pulverized fuel at starting, a prime mover driven by the steam generated for feeding when starting up has been effected, means for regulating and supplying the proper admixture of fuel and air to enclosed refractory furnace having openings through which the heated gases generated in the furnace passes to the heating elements of the boiler or steam generator.

In the accompanying drawings I have illustrated my invention applied to a locomotive.

Fig. 1 is a vertical longitudinal sectional view of my improved apparatus.

Figure 2:
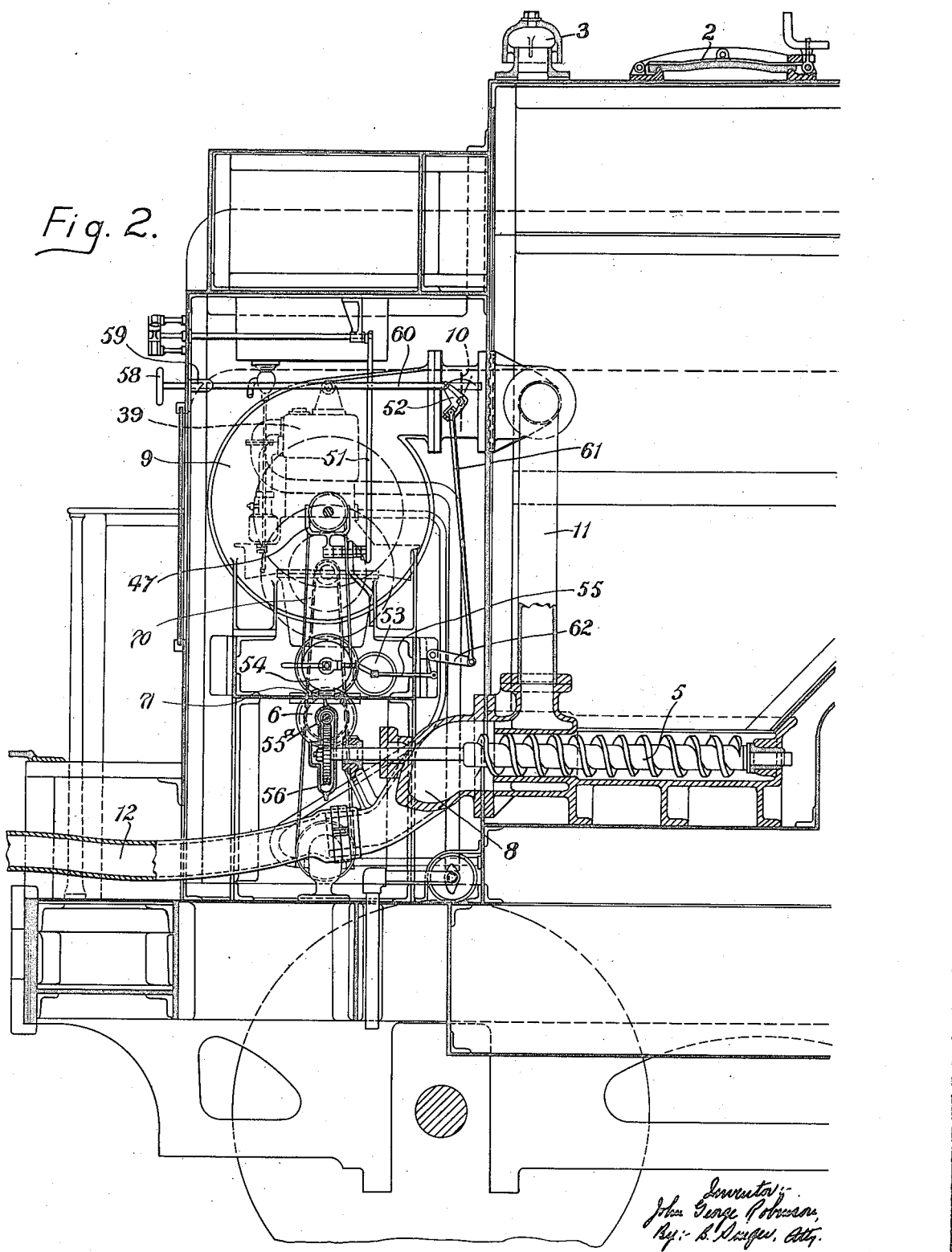
Figure 3:
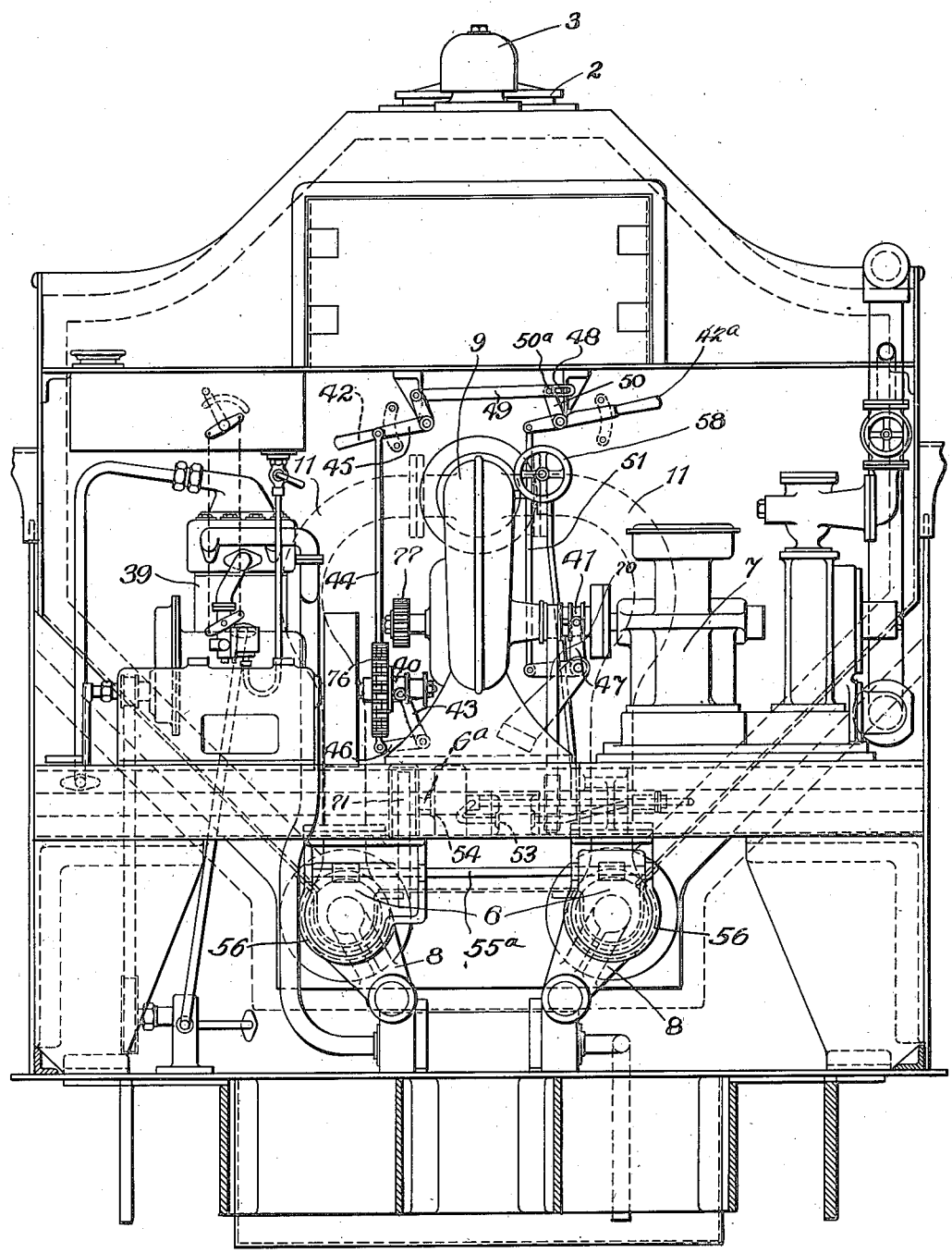
Figure 3B:
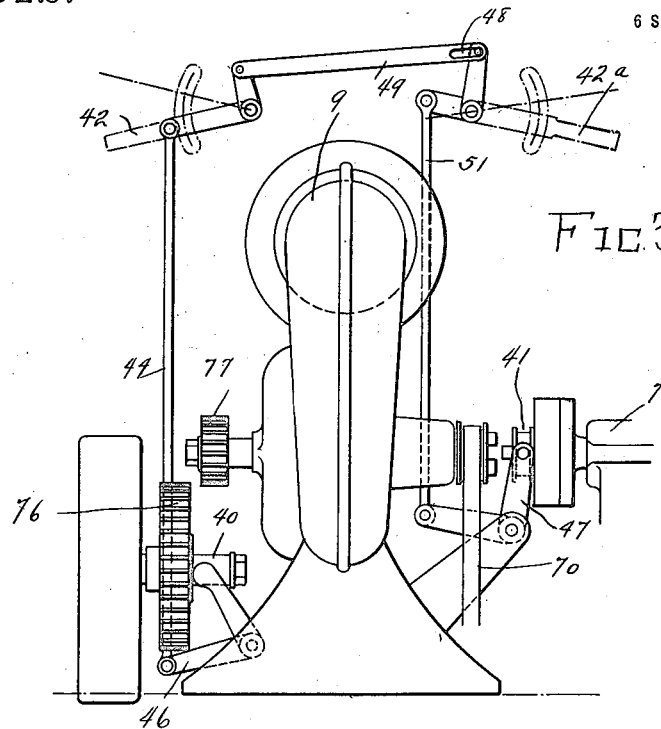
Figure 3C:
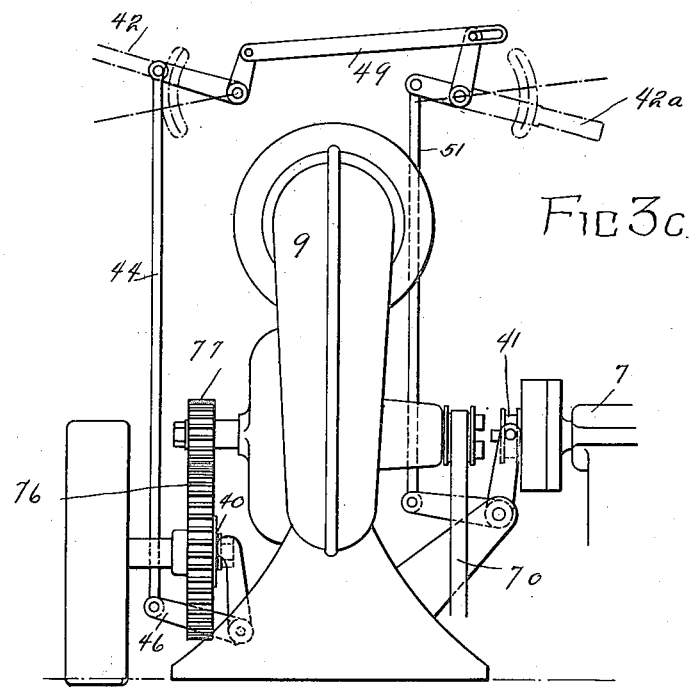

Fig. 2 a sectional view of the front part of the tender,

Fig. 3 a front elevational view of the tender,

Figure 3ª is an enlarged view showing the operative connections.

Figs. 3ᵇ and 3ᶜ are similar views illustrating different positions of the clutches.

Fig. 4 shows cross sections on line A—A and B—B respectively of Fig. 1.

Figure 4ª shows on an enlarged scale, a detail shown in Figure 4.

Fig. 5 is a diagrammatic view illustrating a modification of the means for regulating the supply of pulverized fuel and air.

Referring to these drawings the numeral 1 designates a hopper or receptacle for containing the fuel and this hopper or receptacle is capable of being closed by means of man hole covers 2 closing the filling openings and is ventilated by means of a ventilating cowl 3. The hopper in the present example is carried in the tender but it will be understood that in some cases the hopper or fuel receptacle could be in one with the locomotive after the fashion of an ordinary tank engine.

The fuel before being placed in the hopper or receptacle 1 is ground to pass through a fine mesh screen and is carefully dried so as to contain as little moisture as possible, to enable it to be distributed to the furnace 4 by means of the feeding devices hereinafter referred to.

These feeding devices comprise, in the present example, two horizontal, longitudinal screw or other conveyors 5 of any well known type, and these conveyors are driven through suitable variable speed transmission devices 6 by a steam operated prime mover 7 or other suitable means. It will be appreciated that by the provision of a variable speed gear these conveyors can be driven at any desired speed relative to the prime mover running at constant speed. The variable speed gear may be of any desired form, such, for instance, as a variable stroke pump coupled up to a hydraulic motor as disclosed in United States Patent No. 1,152,729, the drive being transmitted by a belt 70 connecting the shaft of the blower or fan 9 to the driving pulley of the transmission gear 6. From the transmission shaft 6ª the drive is taken by a belt 71 to the worm shaft 55ª and thence to the worm wheels 56 on the shafts of the conveyors 5.

The screw conveyors 5 deliver the pulverized fuel into conical chambers 8 where it is picked up by a strong blast of air from a blower 9. which is, of course, driven from the turbine 7 when clutch 41 is engaged and from the engine 39 when the clutch 40 is engaged, this air being supplied through a regulating valve 10 and pipes 11 and passing thence through the flexible pipes 12 to the inner delivery nozzles 13 of the burners 14, which inner delivery nozzles 13 are concentric with the outer burner tubes 15, leaving annular spaces 16 between the nozzles 13 and outer burner tubes 15 through which air is induced, partly by the chimney blast and partly by the air blast issuing with the fuel from nozzles 13. The rear ends of the outer tubes 15 are provided with annular valves 17, which slide on the outer peripheral surfaces of the inner nozzles 13 and are fitted with hand operating gear for permitting them to be adjusted to regulate the annular opening 72 to enable the supply of induced auxiliary air to be regulated.

This hand operated gear consists as here shown of a slidable rod 18 having its upper end screw threaded and engaging a nut 19, which nut is rotatable by means of the hand wheel 20. The lower end of the rod 18 is coupled to the bell crank lever 21 which is in turn connected to the sliding annular valve 17 by means of the link 22. It will be clear from the foregoing that by operation of the hand wheel 20 the valve 17 will be opened more or less and if desirable an indicator or pointer such as 25 may be provided to indicate the extent to which the valve is opened.

Ports 23 closed by covers 24 are arranged in the burners 14 to enable the pulverized fuel, carried by the blast issuing from nozzles 13 to be ignited initially when starting up. This is effected by inserting cotton waste or the like through the openings 23 and igniting it and then if the covers 24 are closed the operation of starting up can be safely effected. The fuel, together with the forced and induced air, issuing from the burners 14 enters the furnace 4 which is built of a refractory material.

Here the fuel is ignited when the furnace is at work, since the ignition ports 23 are closed after the flame has been once started.

A further supply of air, induced by the chimney draught may be supplied by the ducts 26 and openings 27 in the furnace lining, and the products of combustion then pass through small holes 30 in the baffle structure 31, by which means they are broken up and thoroughly mixed in contact with the hot brickwork, so that combustion is facilitated and expedited. Any unburnt fuel that escapes from the holes 30 is met by a further supply of air induced by the chimney blast through the holes 32 and its combustion is thereby completed.

The furnace, which is of special construction as shown, is formed of very highly refractory material and owing to the very finely divided state of the fuel and its intimate mixture with the air supply, the absence of radiation, by reason of the non-conducting nature of the furnace walls, and the high temperature of the interior surfaces, combustion is extremely rapid and is practically completed during the passage of the fuel from the positions of entry to the tube plate 74.

The furnace as a whole comprises a lower primary combustion chamber 4 and an upper secondary combustion chamber 4ª separated one from the other by the baffle structure 30 the usual brick arch 75 being provided above the baffle structure 30.

The holes 32 may not be necessary and certainly will not be necessary if combustion is completed in the lower part or primary combustion chamber 4 of the furnace beneath the baffle structure. It is however preferable to provide some means by which air can be introduced above the baffle structure 30 if required.

The bottom of the furnace is inclined towards a pit 33 provided with drop doors 34, or other means for removing the incombustible slag and dust from the pit. The air supply through the ducts 26 and holes 27 and 32 is preferably forced through the induction openings 35 which are suitably formed for the purpose, by means of jets of superheated steam issuing from the nozzles 36 which steam is superheated in a special superheater element or elements 37, the supply of superheated steam to the nozzles 36 being controlled by the valve 38. In order to increase the supply of air to the ducts 26 passages 28 are provided in the side walls 29 of the furnace.

In order to operate the blower 9 and screw conveyors 5, when there is no steam in the boiler to work the turbine 7, or when said turbine is not available from any cause, an internal combustion engine 39 of any suitable type is provided. This engine is connected to the rotor of the blower by means of a clutch 40, which is constituted by a gear wheel 76 adapted to be moved into and out of mesh with a pinion 77 on the shaft of the blower. The steam operated prime mover 7 is similarly connected to the other end of the rotor shaft by a clutch 41 and the clutch operating gear is so arranged that one only of the clutches 40 and 41 can be engaged at one time or both may be disengaged. This clutch operating gear, consists of an operating lever 42 connected to operate both the clutches 40 and 41. The operating lever 42 is connected to the operating fork 43 of the clutch 40 by means of the rod 44, connected at one end to the bell crank lever 45 and at the other end to the arm 46 of the clutch operating fork 43 while connection to the operating fork 47 of the clutch 41 is effected by the bell crank lever 50 being provided with a pin 50$^a$ engaging in the lost motion slot 48 in a link 49, which link is connected at its other end to the bell crank lever 45, a rod 51 connecting the bell crank lever 50 with the clutch operating fork 47 of the clutch 41. This will be best understood upon reference to Figure 3$^a$. By this means operation of the lever 42 in one direction throws the clutch 40 in and the clutch 41 out as before and by reason of the lost motion connection there is a neutral position where both clutches are disengaged.

The connections operating the air regulating valve 10 is preferably connected through an adjustable connection with the gear operating the variable speed device 6 before referred to so as to correctly proportion the amount of pulverized fuel delivered by the conveyors 5 to the air delivered by blower 9. This is accomplished by connecting a bell crank lever 52 to operate the valve 10—which may take the form of a flap or butterfly valve—and connecting this bell crank lever to operate the speed varying device. In the accompanying drawings the variable speed gear indicated consists of a variable stroke pump 53 connected up to drive a hydraulic motor 54 and the speed variations are effected by varying the stroke of the pump 53 by moving in and out the stroke varying rod 55. The motion of the motor 54 is communicated to the conveyor screws 5 by worm shaft 55$^a$ gearing with worm wheels 56 keyed to the conveyor screw shafts. The simultaneous regulation of the conveyor screw speed and the air valve 10 is effected from a hand wheel 58 which by means of a screw connection 59 imparts longitudinal motion to a rod 60 connected to the bell crank lever 52. The bell crank lever 52 is connected by the rod 61 and bell crank 62 with the stroke controlling rod 55 of the pump 53. It follows that operation of the hand wheel 58 will cause simultaneous adjustment of the valve 10 and the speed of the variable speed device.

The flexible pipes 12 are preferably connected to the inner nozzles 13 of the burners 14 by means of spring controlled sliding joints—of any known type indicated at 63 in the drawings—in order to allow for the relative movements of the engine and tender on curves, without the necessity of providing an excessive amount of slack in the flexible pipes 12.

The furnace door opening is lined with refractory material, a hole 64 being provided for inspection of the interior of the firebox when the apparatus is at work which hole may be covered by a sheet of mica, or coloured glass, or closed by a drop flap or other suitable means.

It may be advantageous in some cases to regulate both the fuel and air supply automatically and simultaneously in accordance with the variations of the steam pressure or smoke box vacuum of the boiler.

In such a case the adjusting handle 58 would be replaced by a cylinder having a piston operated by the steam pressure or vacuum against a spring. Such an arrangement adapted for operation by steam pressure is shewn diagrammatically in Fig. 5. In this case steam from the boiler passes continuously by the pipe 65 to the cylinder 66 and operates to move the piston 67 and consequently the rod 60 in opposition to the spring, thus operating the valve 10 and the variable gear in the manner before described. By providing a nut for adjusting the compression of the spring 68 the device can be made to operate for various maximum pressures of the boiler. The arrangement is preferably such that at maximum steam pressure the supply of fuel and air is just sufficient to maintain the furnace in operation without generating more steam than can be safely dealt with by the safety valve.

What I claim and desire to secure by Letters Patent is:

1. Means for enabling pulverized fuel to be consumed in furnaces comprising a receptacle for the powdered fuel, conveyors associated with the receptacle for conveying the powdered fuel, nozzles adjacent the furnace firebox to which said fuel is conveyed, means for supplying an air blast to the nozzles whereby the fuel conveyed to said nozzles is blown into the furnace firebox, a prime mover driven by steam generated in the boiler heated by said furnace for normally driving said conveyors and said air blast supplying means, a second prime mover for driving said conveyors and said air blast supplying means, and means for connecting up either of said prime movers to drive said conveyors and air blast supplying means and simultaneously disconnecting the other of said prime movers at will, means for varying the speed of the fuel conveyors, air valve controlling means, and a connection between said speed varying means and said air controlling means whereby the supplies of fuel and air are simultaneously varied.

2. Apparatus for enabling pulverized fuel to be consumed in furnaces of locomotives, comprising a tender constructed to form a receptacle for storing the powdered fuel, screw conveyors carried by the tender and located in the bottom of the storage receptacle, pipes leading from said conveyors, nozzles adjacent the furnace firebox on the locomotive to which said fuel is conveyed, flexible connections between said nozzles and said pipes leading from said screw conveyors, spring controlled sliding joints between said pipes and said nozzles, means for supplying an air blast to the nozzles whereby the fuel conveyed to said nozzles is blown into the furnace firebox, a prime mover driven by steam generated in the boiler heated by said furnace for normally driving said conveyors and said air blast supplying means, a second prime mover for use at starting, and means for connecting up either of said prime movers to drive said conveyors and air blast supplying means and simultaneously disconnecting the other of said prime movers at will, substantially as specified.

3. Means for enabling pulverized fuel to be consumed in furnaces comprising a receptacle for the powdered fuel, conveyors associated with the receptacle for conveying the powdered fuel, nozzles adjacent the furnace firebox to which said fuel is conveyed, means for supplying an air blast to the nozzles whereby the fuel conveyed to said nozzles is blown into the furnace firebox, an air induction pipe located between each of the nozzles and the furnace firebox, a valve closing the end of said induction pipe, hand operated means for sliding said valve and thus regulating the opening to said induction pipe whereby the auxiliary air supply induced through said induction pipe can be regulated, a prime mover driven by steam generated in the boiler heated by said furnace for normally driving said conveyors and said air blast supplying means, a second prime mover for driving said conveyors and said air blast supplying means, and means for connecting up either of said prime movers to drive said conveyors and air blast supplying means and simultaneously disconnecting the other of said prime movers at will, means for varying the speed of the fuel conveyors, air valve controlling means, and a connection between said speed varying means and said air controlling means whereby the supplies of fuel and air are simultaneously varied.

4. Means for enabling pulverized fuel to be consumed in furnaces comprising a receptacle for the powdered fuel, conveyors associated with the receptacle for conveying the powdered fuel, nozzles adjacent the furnace firebox to which said fuel is conveyed, means for supplying an air blast to the nozzles whereby the fuel conveyed to said nozzles is blown into the furnace firebox, an air induction pipe located between each of the nozzles and the furnace firebox, ignition openings in said induction pipes, and means for completely closing said ignition openings, and hand operated means for regulating the opening to said induction pipe whereby the air supply induced through said induction pipe can be regulated, a prime mover driven by steam generated in the boiler heated by said furnace for normally driving said conveyors and said air blast supplying means, a second prime mover for driving said conveyors and said air blast supplying means, and means for connecting up either of said prime movers to drive said conveyors and air blast supplying means and simultaneously disconnecting the other of said prime movers at will, means for varying the speed of the fuel conveyors, air valve controlling means, and a connection between said speed varying means and said air controlling means whereby the supplies of fuel and air are simultaneously varied.

5. Means for enabling pulverized fuel to be consumed in furnaces comprising a receptacle for the powdered fuel, conveyors associated with the receptacle for conveying the powdered fuel, nozzles adjacent the furnace firebox to which said fuel is conveyed, means for supplying an air blast to the nozzles whereby the fuel conveyed to said nozzles is blown into the furnace firebox, steam operated injector nozzles for supplying additional auxiliary air to said furnace firebox, a superheater element for supplying superheated steam to operate said nozzles, a prime mover driven by steam generated in the boiler heated by said furnace for normally driving said conveyors and said air blast supplying means, a second prime mover for driving said conveyors and said air blast supplying means, and means for connecting up either of said prime movers to drive said conveyors and air blast supplying means and simultaneously disconnecting the other of said prime movers at will, means for varying the speed of the fuel conveyors, air valve controlling means, and a connection between said speed varying means and said air controlling means whereby the supplies of fuel and air are simultaneously varied.

6. Means for enabling pulverized fuel to be consumed in furnaces comprising a receptacle for the powdered fuel, conveyors associated with the receptacle for conveying the powdered fuel, a primary combustion chamber, a baffle structure having openings, said baffle structure separating the primary combustion chamber from a secondary combustion chamber above said baffle structure, a brick arch located above said baffle structure, nozzles adjacent the primary combustion chamber to which said fuel is conveyed, means for supplying an air blast to the nozzles whereby the fuel conveyed to said nozzles is blown into the primary combustion chamber, a prime mover driven by steam generated in the boiler heated by said furnace for normally driving said conveyors and said air blast supplying means, a second prime mover for driving said conveyors and said air blast supplying means, and means for connecting up either of said prime movers to drive said conveyors and air blast supplying means and simultaneously disconnecting the other of said prime movers at will, means for varying the speed of the fuel conveyors, air valve controlling means, and a connection between said speed varying means and said air controlling means whereby the supplies of fuel and air are simultaneously varied.

In testimony whereof I affix my signature in presence of two witnesses.

JOHN GEORGE ROBINSON.

Witnesses:
ARTHUR WILLIAM JOY,
GEOFFREY HERBERT VANKIVELT.